United States Patent Office 3,472,648
Patented Oct. 14, 1969

3,472,648
TREATMENT OF TITANIUM OXIDES
Ernesto Suriani, Freehold, N.J., assignor to Pullman Incorporated, Chicago, Ill., a corporation of Delaware
No Drawing. Continuation-in-part of application Ser. No. 468,770, July 1, 1965. This application Jan. 26, 1968, Ser. No. 700,754
Int. Cl. C22b 53/00, 21/00, 5/12
U.S. Cl. 75—1
19 Claims

ABSTRACT OF THE DISCLOSURE

A method for treating a material containing an oxide of titanium which comprises reacting said material with a halide of a metal of Groups I–A, II–A and VII–B of the Periodic Chart and hydrogen to form a reduction product containing titanium in elemental form and a hydrogen halide.

---

This application is a continuation-in-part of my prior and co-pending application Ser. No. 468,770, filed July 1, 1965, now U.S. Patent No. 3,366,447, granted January 30, 1968.

The present invention relates to a method for the removal of chemically bonded oxygen from an oxide of titanium. In one aspect the invention relates to a method for the treatment of a material comprising an oxide of titanium to provide a titanium product essentially free of titanium oxides. In another aspect, the present invention relates to a novel method and reaction for the formation of elemental titanium and hydrogen halide during the treatment of oxides of titanium.

It is known that titanium and its alloys are valuable structural materials, particularly in aeronautical applications and in the manufacture of specialty chemical and marine equipment. Notwithstanding its excellent physical, mechanical and corrosion resistance properties, usage of titanium and its alloys has been influenced to a large extent by high-cost considerations.

Titanium oxides are found in naturally occurring ores including rutile which consists essentially of titanium dioxide, and lower grade ores such as the ilmenites. High purity titanium dioxide may be obtained from rutile by chlorinating the ore, recovering high purity titanium tetrachloride, and burning the latter to form the dioxide. Ilmenites are beneficiated by the well-known method based on digestion of the ore with sulfuric acid followed by treatment of the resultant mixture of titanium and iron sulfates to separate the iron salts and subsequent hydrolysis of titanium sulfate to an insoluble hydrate which is then calcined to titanium dioxide.

Although titanium dioxide is relatively abundant in nature and although considerable advances have been made in its recovery in varying degrees of purity, there is a need for advancing the art of titanium metal formation. Various methods available for formation of titanium metal comprise utilization of titanium tetrachloride as the raw material, the tetrachloride in turn being derived from the dioxide. For example, titanium tetrachloride is produced by chlorination of titanium dioxide in the presence of carbon at temperatures usually between about 850° to 1250° C. at which temperatures the following reaction occurs:

$$TiO_2 + 2Cl_2 + 2C \rightarrow TiCl_4 + 2CO \qquad (1)$$

Titanium tetrachloride is then reduced to the metal with certain metals such as sodium, calcium and magnesium. For example, in accordance with the most widely practiced method which is usually associated with Wilhelm Kroll, titanium tetrachloride is reduced with molten magnesium metal under an inert atmosphere such as helium. The reaction is highly exothermic and is expressed by the following equation:

$$TiCl_4 + 2Mg \rightarrow Ti + 2MgCl_2 \qquad (2)$$

One drawback to the reactions shown above is that, since they require two expensive chemicals, i.e., chlorine and magnesium metal, the cost of the titanium product is necessarily high.

It is therefore an object of this invention to provide a novel method and reaction for the removal of chemically bonded oxygen from an oxide of titanium.

Another object is to provide a particular method for the formation of titanium metal which method does not depend upon the use of titanium tetrachloride as a raw material.

Another object is to provide a novel chemical reaction for the direct conversion of an oxide of titanium to titanium metal.

A further object of this invention is to provide a novel method and reaction for producing hydrogen halide during the treatment of materials comprising an oxide of titanium.

A further object is to provide a method having the aforesaid characteristics and which in addition has economic advantages over presently practiced methods.

Various other objects and advantages of this invention will become apparent to those skilled in the art from the accompanying description and disclosure.

The above objects are generally accomplished by the method which comprises reacting a material comprising an oxide of titanium with selected metal halides, which are hereinafter described, and hydrogen under conditions such that titanium which is free of chemically bonded oxygen and hydrogen halide are formed. More particularly, the titanium oxide bearing reactant is heated in contact with hydrogen and a halide of a metal of Groups I–A, II–A, VII–B of the Periodic Table, under conditions including an elevated temperature such that there are provided a reaction product comprising titanium metal and a gaseous reaction product comprising hydrogen halide. In addition to being a method for removing chemically bonded oxygen from the titanium oxide reactant by direct chemical reaction of the oxide, the method of this invention possesses the further advantage of providing hydrogen halide as a second useful product.

The oxides of titanium which are reacted by the method of this invention include titanium monoxide (TiO), titanium sesquioxide ($Ti_2O_3$), trititanium pentoxide ($Ti_3O_5$), titanium dioxide ($TiO_2$) and the corresponding various crystallographic forms. It is to be understood, therefore, that terms such as "titanium oxide" and "oxide of titanium" as employed herein to describe the method of this invention, are intended to include within their scope any of the aforementioned specific oxides. Although any one or combination of the indicated oxides are suitable reactants, titanium dioxide is usually employed in view of its greater availability and abundance in nature. The titanium oxide reactant may be added to the reaction zone in any degree of purity, including the various titanium oxide bearing ores such as rutile and ilmenites in either native or beneficated forms. From the standpoint of facilitating recovery of titanium metal from the product of reaction, it is preferred practice to employ a titanium oxide bearing starting material at least 90 percent by weight of which is titanium oxide, expressed as $TiO_2$, such as for example, rutile which contains on an average basis approximately 95 weight percent of titania ($TiO_2$), and substantially pure titania produced by chemical benefication of rutile and ilmenites. It is to be understood, however, that the titanium oxide containing starting material may contain the oxide reactant in an amount less than 90 weight percent without departing from the scope of this invention.

The metal halide reactant includes, as indicated above (1) alkali metal halides, i.e., halides of metals of Group I–A, in particular, lithium, sodium and potassium halides; (2) alkaline earth metal halides, i.e., halides of metals of Group II–A, in particular, calcium, barium and magnesium halides; and (3) halides of metals of Group VII–B, in particular, manganese halides. Typical examples of suitable metal halide reactants are lithium chloride, sodium chloride, potassium chloride, sodium fluoride, calcium bromide, calcium chloride, calcium fluoride, magnesium chloride, magnesium fluoride, barium chloride and manganese chloride. Although bromides and iodides are suitable, the alkali metal chlorides, alkaline earth metal chlorides, alkali metal fluorides and alkaline earth metal fluorides constitute preferred groupings of the metal halide reactant from the standpoint of both the availability of certain of these chlorides such as sodium, calcium and magnesium chlorides, and the value of hydrogen chloride and hydrogen fluoride produced as a second reaction product.

The novel reaction of this invention is represented by the following generalized equations wherein titanium dioxide and sesquioxide, respectively, are given as typical of the titanium oxide reactant:

metal halide $+TiO_2+H_2\rightarrow$
　　　　　hydrogen halide $+Ti+$ metal oxide　(3)

metal halide $+Ti_2O_3+H_2\rightarrow$
　　　　　hydrogen halide $+Ti+$ metal oxide　(4)

More specifically, when the metal halide is an alkali metal halide, the reaction which occurs under the conditions described herein, is expressed by the following equation:

$$4MX+TiO_2+2H_2\rightarrow 4HX+Ti+2M_2O \quad (5)$$

wherein M is any of the alkali metals and X is any of the halides (i.e., fluoride, chloride, bromide and iodide). When the metal halide is an alkaline earth metal halide, the reaction which occurs under the conditions described herein, is expressed by the following equation:

$$2M'X_2+TiO_2+2H_2\rightarrow 4HX+Ti+2M'O \quad (6)$$

wherein M' is any of the alkaline earth metals including magnesium, i.e., a metal of Group II–A, or manganese, and X is any of the halides.

When the titanium oxide starting material is the sesquioxide, the reactions which occur are as follows:

$$6MX+Ti_2O_3+3H_2\rightarrow 6HX+2Ti+3M_2O \quad (7)$$

$$3M'X_2+Ti_2O_3+3H_2\rightarrow 6HX+2Ti+3M'O \quad (8)$$

wherein M, M' and X are as above-defined.

When the titanium oxide starting material is the monoxide, the reactions which occur are as follows:

$$2MX+2TiO+H_2\rightarrow 2HX+2Ti+2MO \quad (9)$$

$$M'X_2+TiO+2H_2\rightarrow 2HX+Ti+M'O \quad (10)$$

wherein M, M' and X are as defined above.

The metal halide and titanium oxide reactants are employed in relative proportions at least sufficient to satisfy the stoichiometric requirements of the reactions of Equations 5–10 above as well as of corresponding reactions based on the use of other titanium oxides. Generally, therefore, the metal halide and titanium oxide reactants are employed in an amount of at least one mole of the metal halide per mol of the oxide. The particular minimum mole ratio depends upon the stoichiometry of the reaction involved and is derived from the above equations. For example, when reacting titanium dioxide and a halide of one of the aforesaid divalent metals, at least two moles of the metal halide are employed per mole of the dioxide (Equation 6) and, when the halide is of a univalent metal, at least four moles are required per mole of the dioxide (Equation 5).

On a weight basis, the metal halide is employed in an amount corresponding to at least about 238 per cent, expressed as magnesium chloride, of the weight of the titanium oxide reactant, expressed as $TiO_2$. When magnesium chloride is employed as the metal halide, the aforesaid general relationship corresponds to an amount of magnesium chloride of at least about 70 percent of the total of the weights of the magnesium chloride and titanium oxide, expressed as $TiO_2$. When the other metal halides are employed, the particular minimum amounts, expressed in weight percent, which correspond to the aforesaid general relationship defined on the basis of $MgCl_2$, are readily determined. For example, when sodium chloride is the metal halide reactant, the minimum amount employed to satisfy the stoichiometric requirements of Equation 5 above, is at least about 292 percent of the weight of the titanium oxide, expressed as $TiO_2$, or at least about 75 weight percent of the total of the weights of the titanium oxide, expressed as $TiO_2$, and sodium chloride. Further, when lithium fluoride is the metal halide reactant, it is employed in an amount of at least about 130 weight percent of the weight of the oxide, or at least about 55 percent, based on the sum of the weights of the titanium oxide (expressed as $TiO_2$) and lithium fluoride.

It is preferred operation to have present in the reaction zone a sufficient excess of metal halide reactant, relative to the titanium oxide, in order to enhance the yield of titanium metal. For this particular purpose, the metal halide is preferably added to the reaction zone in about a 20 mole percent excess above the aforesaid minimum amounts. In order to compensate for consumption of metal halide by reaction thereof in the presence of hydrogen with impurities such as silica which may be in association with the titanium oxide bearing starting material, a further excess of metal halide in proportion to the amount of any such reactive impurities is also employed. From the standpoint of practical considerations and subsequent handling of the solid reaction product to recover titanium metal, more than a 50 mole percent excess of metal halide is usually avoided.

The titanium oxide and metal halide, in the relative proportions described above, are heated in contact with hydrogen at a temperature level sufficiently high to form and evolve hydrogen halide thereby indicating commencement of the conversion of the positive valence form of the combined titanium to a lower valence form including elemental titanium. The reaction is carried out at a temperature of at least 800° C., and at a pressure which is below, equal to or above atmospheric pressure.

The atmosphere containing hydrogen which is required in order to effect reaction of the titanium oxide and metal halide in accordance with the method of this invention can be provided by flowing either a substantially pure or dilute hydrogen bearing gas through the reaction zone in contact with the titanium oxide and selected metal halide reactants in an amount at least sufficient to satisfy the stoichiometric requirements of the reaction. When it is desired to recover the titanium reduction product as titanium metal, the reaction zone is maintained substantially free of gases which are capable of reacting with titanium metal at elevated temperatures. For example, it is known that nitrogen reacts with titanium metal at high temperatures to form titanium nitride. From this standpoint, therefore, the reaction environment is maintained essentially free of nitrogen and hydrogen gas essentially free of nitrogen is employed in order to minimize subsequent reaction of the titanium metal product to form nitrides. On the other hand, when it may be desired to recover the titanium value in a form other than as the metal, nitrogen as a diluent of the gaseous hydrogen reactant may be introduced to the reaction zone such that the titanium metal is converted to the nitride in situ. It is to be understood, however, that in either case the hydrogen reactant may be diluted with other gases which are inert under the reaction conditions such as helium and argon. When it is desired to provide titanium carbide, the reaction is carried out in the presence of carbon or a carbonaceous material.

The titanium oxide may be contacted with gaseous hydrogen and metal halide in any physical form including the solid, molten and gasified states. For example, the metal halide and titanium oxide may first be thoroughly admixed in the solid state and then contacted with hydrogen and, although under the aforesaid temperature conditions, the solid admixture may at least in part become molten, such does not interfere with the course of the reaction to provide titanium metal and hydrogen halide. In the practice of this invention, the titanium oxide may also be contacted with hydrogen and vapors of the metal halide such as, for example, vaporous or gasified magnesium chloride.

During the course of the reaction, gaseous effluent containing hydrogen halide is evolved. The hydrogen halide product is recovered therefrom by cooling the effluent as required to condense and separate any vapors of excess metal halide which may be contained therein, followed by scrubbing of the remaining gaseous effluent with a neutral or basic solution to absorb hydrogen halide. Remaining gaseous effluent comprising excess hydrogen may be recycled to the reaction zone, as desired. The titanium-containing reaction mixture is cooled and treated to recover elemental titanium. The reaction product which is a normally solid material (i.e., a solid at standard conditions of temperature and pressure as well as at ordinary room temperatures), comprises, in addition to elemental titanium, the oxide of the metal corresponding to that of the metal halide reactant and which is formed as a by-product, and varying amounts of unreacted or excess metal halide and other impurities such as metal titanates. The solid reaction product may be leached initially with water as a convenient way of removing excess metal halide and then with a strong acid such as hydrochloric acid, nitric acid, aqua regia, or weak acids such as acetic acid, the acidic leaching media removing the aforesaid solid impurities from the titanium product. When it is desired to regenerate metal halide for re-use in the process, leaching with hydrochloric acid is preferred. Purification is also accomplished by placing the solid reaction product in an induction furnace heated up to about 2000° C. or higher to liquefy the titanium metal which is readily collected and separated, the impurities being discarded as slag. In order to avoid loss of titanium value as metal titanates and also to facilitate work-up of the solid reaction product, it is preferred to carry out the present reaction under conditions which minimize the formation of metal titanates. Accordingly, it is recommended practice to minimize the presence of water in the reaction zone by employing essentially anhydrous reactants in order to substantially prevent hydrolysis of metal halide, in particular hydrolysis of the alkaline earth metal halides including magnesium halides, to their corresponding oxides. When water is present in the reaction system, it is clear that a further excess of the metal halide is required to make up for the amount which may be hydrolyzed.

The following is offered as a further understanding of the present invention and for illustrative purposes and accordingly, is not to be construed as unnecessarily limiting to the scope thereof.

Example

The reaction of this example is carried out in a vertical Inconel tube (1 inch inner diameter and 2 feet in length) positioned within the heating zone of an electrically heated tubular furnace which can be heated up to 1430° C. The reactor is provided with an Inconel sparger tube by means of which hydrogen gas is fed into the reactor and with a distilling head for removal of effluent gas. The reactor is charged with a mixture of 20 grams of anhydrous titanium dioxide and 60 grams of anhydrous magnesium chlorate after which the temperature of the solids is raised to 800° C. Air is removed from the reactor by purging with nitrogen followed by introduction of a stream of nitrogen-free hydrogen into the sparger tube such that hydrogen is distributed through and in contact with the mixture of titanium dioxide and magnesium chloride. The hydrogen is continuously passed through the sparger tube at an average flow rate of 1 liter of gas per minute. As the hydrogen gas contacts the reaction mixture at 800° C., hydrogen chloride forms and is withdrawn in the effluent gas which also contains excess hydrogen. Hydrogen chloride is collected by passing the gaseous effluent through a scrubber containing a one normal solution of sodium hydroxide. The temperature of the reaction mixture is slowly increased above 800° C until the rate of hydrogen chloride collection in the scrubber, as determined by titration, is increased to about 10 millimoles per minute, and the reaction is continued until no more hydrogen chloride is produced. The hydrogen flow is then stopped and the reactor is purged with helium after which the reaction mass is cooled to room temperature. The cooled solid reaction mixture is removed from the reactor and contains titanium metal, magnesium oxide by-product, unreacted magnesium chloride and a small amount of magnesium titanate. To remove these latter impurities, the reaction product is first leached with water to dissolve the magnesium chloride and then with concentrated hydrochloric acid in order to dissolve magnesium oxide and titanate. The purified residue is a black powder of titanium metal.

When the procedure of the above example is repeated using 20 grams of each of titanium sesquioxide and tritianium pentoxide admixed respectively with about 50 grams of magnesium chloride, titanium metal and hydrogen chloride are also provided. Accordingly, by the method of this invention, oxides of titanium are reduced and chemically bonded oxygen removed therefrom to form a reduction product comprising titanium metal and hydrogen halide by heating the oxide and metal halide with hydrogen at a temperature of at least 800° C.

On the basis of the above, it is the inventor's hypothesis, which is not intended to limit the present invention, that metal halides which are directly reducible by hydrogen gas thereby obtaining the corresponding hydrogen halide and elemental metal at temperatures below about 1000° C., are not useful in the present invention. On the other hand, metal halides which are not directly reducible by hydrogen gas, for example, at temperatures up to 1000° C., i.e., such that when such metal halides are treated with hydrogen no hydrogen halide is evolved, are generally useful in the present invention. In addition to reduction of titanium oxides by metal halides, described above, silicon dioxide ($SiO_2$), boron oxide ($B_2O_3$) and aluminum oxide ($Al_2O_3$), which compounds cannot be reduced to any appreciable extent employing hydrogen gas, alone, can be reduced and oxygen removed therefrom when such compounds are treated with hydrogen gas at an elevated temperature in the presence of metal halides such as, e.g., calcium chloride. It is contemplated that, in general, metal oxides in which the bonding free energy of the oxygen is greater than about 58 kilocalories/mol will react with selected metal halides, e.g., calcium chloride, to evolve hydrogen halide, water, and to yield a reduction product of the metal oxide. In the case of the reduction of $SiO_2$ and $Al_2O_3$, for example, the reactions have been carried out to obtain elemental silicon and aluminum. It is further noted that as described and claimed in my aforesaid application Ser. No. 468,770, filed July 1, 1965, and now U.S. Patent No. 3,366,447 aluminum phosphate, selected metal halides and hydrogen react at elevated temperatures to provide elemental phosphorous and hydrogen halide.

Various modifications and alterations of the method and reaction described herein may become apparent to those skilled in the art without departing from the scope of the present invention.

What is claimed is:

1. A method for removal of chemically bonded oxygen from an oxide of titanium which comprises reacting an oxide of titanium and a metal halide selected from the group consisting of alkali metal halides, alkaline earth metal halides and halides of metals of Group VII–B of the Periodic Chart, in the presence of hydrogen and at an elevated temperature of at least 800° C., to produce hydrogen halide and titanium in a form which is free of chemically bonded oxygen.

2. The method of claim 1 in which said metal halide comprises an alkali metal chloride and the hydrogen halide comprises hydrogen chloride.

3. The method of claim 2 in which said alkali metal chloride comprises lithium chloride.

4. The method of claim 2 in which said alkali metal halide comprises sodium chloride.

5. The method of claim 2 in which said alkali metal halide comprises potassium chloride.

6. The method of claim 1 in which said metal halide comprises an alkaline earth metal chloride and the hydrogen halide comprises hydrogen chloride.

7. The method of claim 6 in which said alkaline earth metal chloride comprises magnesium chloride.

8. The method of claim 6 in which said alkaline earth metal chloride comprises calcium chloride.

9. The method of claim 6 in which said alkaline earth metal chloride comprises barium chloride.

10. The method of claim 1 in which said halide of metals of Group VII–B of the Periodic Chart comprises manganese chloride and the hydrogen halide comprises hydrogen chloride.

11. The method of claim 1 in which said metal halide comprises an alkali metal fluoride and the hydrogen halide comprises hydrogen fluoride.

12. The method of claim 11 in which said alkali metal fluoride comprises sodium fluroide 13. The method of claim 1 in which said metal halide comprises an alkaline earth metal fluoride and the hydrogen halide comprises hydrogen fluoride.

14. The method of claim 13 in which said alkaline earth metal fluoride comprises calcium fluoride.

15. A method for converting a titanium oxide to elemental titanium which comprises heating a titanium oxide-bearing reactant selected from the group consisting of a titanium oxide-containing ore containing at least 90 percent by weight of titanium oxide, expressed as titanium dioxide, and a titanium oxide-containing material which is derived from an ore and which contains at least 90 percent by weight of titanium oxide, expressed as titanium dioxide, with an alkaline earth metal chloride in the presence of hydrogen at a temperature of at least 800° C., to produce a normally solid reaction product containing elemental titanium and a gaseous reaction product comprising hydrogen chloride.

16. A method for producing elemental titanium and hydrogen chloride which comprises: introducing to a reaction zone titanium dioxide, magnesium chloride and a hydrogen-containing gas, in said reaction zone heating said titanium dioxide and magnesium chloride in the presence of said hydogen-containing gas at a temperature of at least 800° C., and withdrawing from said reaction zone a reaction product comprising elemental titanium and gaseous effluent containing hydrogen chloride, and recovering elemental titanium as a product of the process.

17. The method of claim 16 in which magnesium chloride is present in an amount of at least two moles per mole of titanium dioxide.

18. The method of claim 16 which is carried out under substantially anhydrous conditions.

19. A method for removal of chemically bonded oxygen from an oxide of titanium which comprises introducing to a reaction zone a titanium oxide-containing reactant selected from the group consisting of a titanium oxide-containing ore and a titanium oxide-containing material derived from an ore, and a metal halide reactant selected from the group consisting of a halide of lithium, sodium, potassium, calcium, barium, magnesium and manganese, in said reaction zone heating said titanium oxide-containing reactant and said metal halide in the presence of hydrogen under conditions including an elevated temperature of at least 800° C. such that said titanium oxide, metal halide and hydrogen undergo reaction to produce hydrogen halide and a reaction product containing titanium in a form essentially free of chemically bonded oxygen.

References Cited
UNITED STATES PATENTS

| | | | |
|---|---|---|---|
| 2,777,763 | 1/1957 | Whaley | 75—84 |
| 2,783,192 | 2/1957 | Dean | 75—48 X |
| 2,807,539 | 9/1957 | Quin | 75—84 |
| 2,834,667 | 5/1958 | Rostron | 75—84 X |
| 2,904,428 | 9/1959 | Dean | 75—84 |
| 3,140,170 | 7/1964 | Henrie et al. | 75—84 |
| 3,152,885 | 10/1964 | Raney | 75—84 |
| 3,188,200 | 6/1965 | Brothers | 75—84 |

CARL D. QUARFORTH, Primary Examiner
M. J. SCOLNICK, Assistant Examiner

U.S. Cl. X.R.
75—84